United States Patent
Luedtke et al.

(10) Patent No.: US 12,091,027 B2
(45) Date of Patent: Sep. 17, 2024

(54) VEHICLE ELECTRIC MOTOR TEMPERATURE ESTIMATION USING NEURAL NETWORK MODEL

(71) Applicants: Daniel R Luedtke, Beverly Hills, MI (US); Mustafa Mohamadian, Birmingham, MI (US)

(72) Inventors: Daniel R Luedtke, Beverly Hills, MI (US); Mustafa Mohamadian, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 425 days.

(21) Appl. No.: 17/376,990

(22) Filed: Jul. 15, 2021

(65) Prior Publication Data

US 2023/0019118 A1 Jan. 19, 2023

(51) Int. Cl.
*B60W 50/12* (2012.01)
*B60L 58/16* (2019.01)
*G06F 18/214* (2023.01)
*G06N 3/02* (2006.01)

(52) U.S. Cl.
CPC ............. *B60W 50/12* (2013.01); *B60L 58/16* (2019.02); *G06F 18/214* (2023.01); *G06N 3/02* (2013.01)

(58) Field of Classification Search
CPC ....... B60W 50/12; B60L 58/16; B60L 3/0061; B60L 2240/425; B60L 2260/46; G06F 18/214; G06F 18/2413; G06N 3/02; G06N 3/044
See application file for complete search history.

(56) References Cited

U.S. PATENT DOCUMENTS

| | | | | |
|---|---|---|---|---|
| 5,900,555 | A * | 5/1999 | Westphal | G01K 7/42 374/E7.042 |
| 6,070,471 | A * | 6/2000 | Westphal | G01K 7/42 374/E7.042 |
| 9,774,287 | B1 * | 9/2017 | Simili | H02P 21/0089 |
| 10,700,632 | B1 * | 6/2020 | Yoo | B60L 15/20 |
| 11,581,835 | B1 * | 2/2023 | Maharjan | H02P 29/662 |
| 2003/0076064 | A1 * | 4/2003 | Kleinau | G05B 13/04 374/E7.042 |
| 2004/0257011 | A1 * | 12/2004 | Rechberger | H02P 9/00 318/139 |
| 2006/0038539 | A1 * | 2/2006 | Swahn | H02P 9/10 322/24 |

(Continued)

FOREIGN PATENT DOCUMENTS

| | | | | |
|---|---|---|---|---|
| CN | 101048712 B | * | 5/2010 | ......... G05B 19/0428 |
| CN | 102809440 B | * | 1/2016 | ............... G01K 7/22 |

(Continued)

*Primary Examiner* — B M M Hannan
(74) *Attorney, Agent, or Firm* — Jeremy J. Klobucar

(57) ABSTRACT

A temperature estimation system and method for an electric motor of a vehicle include a set of sensors configured to measure a set of operating parameters of the electric motor including at least (i) phase current, (ii) speed, and (iii) coolant temperature and a controller configured to access a trained artificial neural network (ANN) temperature estimation model, using the trained ANN temperature estimation model with the set of electric motor operating parameters as inputs, estimate temperatures of a stator and a rotor of the electric motor, and control operation of the electric motor based on the estimated stator and rotor temperatures.

12 Claims, 3 Drawing Sheets

(56) References Cited

U.S. PATENT DOCUMENTS

| | | | | |
|---|---|---|---|---|
| 2006/0126250 | A1* | 6/2006 | Sychra | H02H 7/085 |
| | | | | 361/103 |
| 2006/0250154 | A1* | 11/2006 | Gao | H02H 6/005 |
| | | | | 324/765.01 |
| 2008/0010036 | A1* | 1/2008 | Swahn | H02P 23/14 |
| | | | | 702/132 |
| 2009/0189561 | A1* | 7/2009 | Patel | H02H 7/0852 |
| | | | | 310/68 C |
| 2010/0100248 | A1* | 4/2010 | Minto | G05B 13/027 |
| | | | | 700/287 |
| 2010/0156338 | A1* | 6/2010 | Lu | H02P 29/64 |
| | | | | 361/25 |
| 2011/0050141 | A1* | 3/2011 | Yeh | H02P 29/664 |
| | | | | 318/434 |
| 2011/0181217 | A1* | 7/2011 | Vollmer | H02P 29/662 |
| | | | | 318/400.21 |
| 2011/0279074 | A1* | 11/2011 | Yeh | G01K 13/08 |
| | | | | 318/473 |
| 2012/0133313 | A1* | 5/2012 | Xie | B60W 20/00 |
| | | | | 318/473 |
| 2012/0212169 | A1* | 8/2012 | Wu | H02P 21/141 |
| | | | | 318/432 |
| 2012/0330483 | A1* | 12/2012 | Campbell | H02P 23/14 |
| | | | | 318/473 |
| 2013/0090791 | A1* | 4/2013 | Yeh | F02D 41/14 |
| | | | | 374/102 |
| 2014/0117909 | A1* | 5/2014 | Kim | H02P 7/06 |
| | | | | 318/473 |
| 2014/0149012 | A1* | 5/2014 | Shiraki | B60T 13/741 |
| | | | | 701/70 |
| 2017/0058715 | A1* | 3/2017 | Geveci | F02C 6/18 |
| 2017/0126166 | A1* | 5/2017 | Simili | G01R 31/343 |
| 2017/0131158 | A1* | 5/2017 | Matsubara | H02P 29/60 |
| 2017/0133972 | A1* | 5/2017 | Ito | H02P 29/64 |
| 2017/0359008 | A1* | 12/2017 | Kano | H02P 6/28 |
| 2019/0154024 | A1* | 5/2019 | De Keyser | F04B 49/065 |
| 2019/0229672 | A1* | 7/2019 | Wiedmann | H01J 35/101 |
| 2019/0341831 | A1* | 11/2019 | Winkelmeyr | H02K 9/197 |
| 2019/0368490 | A1* | 12/2019 | Maishigi | F04C 28/28 |
| 2019/0390657 | A1* | 12/2019 | Zeichfüssl | H02P 6/06 |
| 2020/0036311 | A1* | 1/2020 | Freire | H02P 21/22 |
| 2022/0052633 | A1* | 2/2022 | Reddy | H02P 23/0022 |
| 2022/0194233 | A1* | 6/2022 | Reuter | B60K 7/0007 |
| 2022/0345071 | A1* | 10/2022 | Nagano | G01K 13/08 |
| 2022/0393634 | A1* | 12/2022 | Tanaka | G01R 27/02 |
| 2024/0014766 | A1* | 1/2024 | Hahn | H02P 23/0022 |

FOREIGN PATENT DOCUMENTS

| | | | | |
|---|---|---|---|---|
| CN | 111049450 A | | 4/2020 | |
| CN | 111092579 A | | 5/2020 | |
| DE | 3910319 A1 | * | 10/1989 | |
| DE | 102020214228 A1 | * | 5/2022 | H02P 23/0022 |
| DE | 102020214234 A1 | * | 5/2022 | |
| JP | 2022182768 A | * | 12/2022 | |
| WO | WO-2013117500 A2 | * | 8/2013 | B60L 50/13 |
| WO | WO-2019053280 A1 | * | 3/2019 | B60R 9/04 |
| WO | 2020145078 A1 | | 7/2020 | |

\* cited by examiner

VEHICLE ELECTRIC MOTOR TEMPERATURE ESTIMATION USING NEURAL NETWORK MODEL

FIELD

The present application generally relates to electric motors and, more particularly, to techniques for estimating the temperature of vehicle electric motors using a neural network model.

BACKGROUND

Electric motors are often utilized in electrified vehicles to generated drive torque. Copper and core losses during operation contribute to excessive heat in electric motors. When electric motor temperatures are high, a control system should react by limiting torque production in order to maintain performance and lifespan of the electric motor (e.g., by mitigating potential insulation damage and demagnetization). Conventional solutions for monitoring electric motor temperature include temperature sensors, which are costly and difficult to implement, and basic models or indirect measurements (based on other parameters), which are not as accurate as desired. Conventional solutions often require detailed information about the electric motor's cooling system architecture. Accordingly, while such conventional electric motor control systems do work well for their intended purpose, there exists an opportunity for improvement in the relevant art.

SUMMARY

According to one example aspect of the invention, a temperature estimation system for an electric motor of a vehicle is presented. In one exemplary implementation, the system comprises a set of sensors configured to measure a set of operating parameters of the electric motor including at least (i) phase current, (ii) speed, and (iii) coolant temperature and a controller configured to access a trained artificial neural network (ANN) temperature estimation model, using the trained ANN temperature estimation model with the set of electric motor operating parameters as inputs, estimate temperatures of a stator and a rotor of the electric motor, and control operation of the electric motor based on the estimated stator and rotor temperatures.

In some implementations, the trained ANN temperature estimation model is a recurrent-type ANN that also uses the estimated stator and rotor temperatures as inputs. In some implementations, two of the inputs provided to the trained ANN temperature estimation model include the estimated stator and rotor temperatures delayed by first and second delays, respectively. In some implementations, the first and second delays are approximately 100 milliseconds and 200 milliseconds, respectively. In some implementations, the trained ANN temperature estimation model is trained using temperature measurements from a thermocouple mounted on the stator and an infrared sensor directed at the rotor. In some implementations, the system does not include a temperature sensor associated with the stator or the rotor. In some implementations, the controller does not utilize empirical look-up tables for estimation of the stator and rotor temperatures.

According to another example aspect of the invention, a temperature estimation method for an electric motor of a vehicle is presented. In one exemplary implementation, the method comprises measuring, by a set of sensors, a set of operating parameters of the electric motor including at least (i) phase current, (ii) speed, and (iii) coolant temperature, accessing, by a controller of the vehicle, a trained artificial neural network (ANN) temperature estimation model, using the trained ANN temperature estimation model with the set of electric motor operating parameters as inputs, estimating, by the controller, temperatures of a stator and a rotor of the electric motor, and controlling, by the controller, operation of the electric motor based on the estimated stator and rotor temperatures.

In some implementations, the trained ANN temperature estimation model is a recurrent-type ANN that also uses the estimated stator and rotor temperatures as inputs. In some implementations, two of the inputs provided to the trained ANN temperature estimation model include the estimated stator and rotor temperatures delayed by first and second delays, respectively. In some implementations, the first and second delays are approximately 100 milliseconds and 200 milliseconds, respectively. In some implementations, the trained ANN temperature estimation model is trained using temperature measurements from a thermocouple mounted on the stator and an infrared sensor directed at the rotor. In some implementations, there is no temperature sensor associated with the stator or the rotor. In some implementations, the controller does not utilize empirical look-up tables for estimation of the stator and rotor temperatures.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional solutions for monitoring electric motor temperature include temperature sensors, which are costly and difficult to implement, and basic models or indirect measurements (based on other parameters, such as stator resistance and magnet flux), which are not as accurate as desired. The temperature sensor is typically a negative temperature coefficient (NTC) thermistor-type sensor installed on the stator, and requires extra cabling, is difficult to package, and reduces reliability. Also, direct measurement of the rotor temperature is not economically reasonable as the temperature signal needs to be transferred from the rotor to the stator, preferably through a wireless technology. Conventional solutions often require detailed information about the electric motor's cooling system architecture. Also, in order to reduce the computation burden of the model, the model is over simplified which results in estimation errors which is usually remedied by extensive empirical look-up tables (LUTs). Lastly, indirect measurement solutions suffer from difficulties in inverter non-linearity compensation, additional signal injection requirements, and the highly non-linear nature of electric motors.

Accordingly, improved electric motor temperature estimation techniques are presented herein. These techniques utilize an artificial neural network (ANN) temperature estimation model trained using data gathered from one or more thermocouples temporarily connected to the stator and an infrared temperature sensor temporarily directed at the rotor. This trained ANN temperature estimation model is then utilized with various inputs (e.g., phase current, speed, coolant temperature, coolant flow rate, etc.) along with previous samples/feedback to accurately estimate the stator/rotor temperatures in real-time, which are then utilized for improved electric motor control (improved torque production, improved efficiency, etc.). While vehicle electric traction motors are specifically described herein, it will be appreciated that these temperature estimation techniques could be used for any suitable electric motor application.

Figure 1:
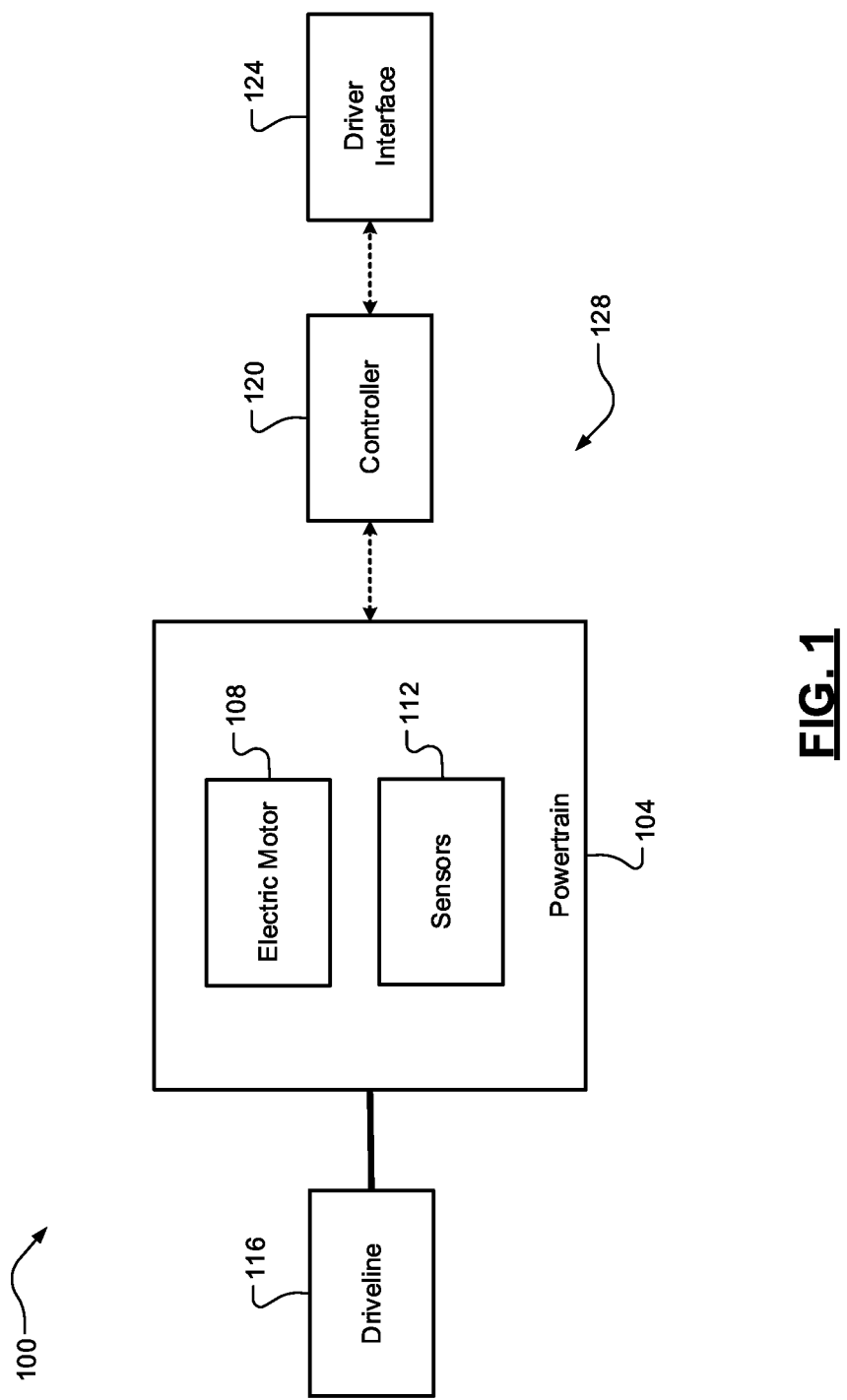
FIG. 1 is a functional block diagram of a vehicle including an electric motor and a temperature estimation system for the electric motor according to the principles of the present application.

Referring now to FIG. 1, a functional block diagram of an electrified vehicle 100 (hereinafter, "vehicle 100") according to the principles of the present application is illustrated. The vehicle 100 comprises an electrified powertrain 104 including an electric motor 108 a set of one or more sensors 112 associated with the electric motor 108. The set of sensors 112 could include, for example, phase current sensors, a speed sensor, and a coolant temperature sensor. It will be appreciated that the electrified powertrain 104 could also include other suitable components, such as an internal combustion engine and a transmission. The electrified powertrain 104 is configured to generate drive torque that is transferred (e.g., via a transmission) to a driveline 116 for vehicle propulsion. A controller 120 is configured to control operation of the vehicle 100, including primarily controlling the electrified powertrain 104 to generate a desired amount of drive torque, such as based on driver input via a driver interface 124 (e.g., an accelerator pedal). The controller 120 and the sensors 112 are also referred to herein as a temperature estimation system 128 for the electric motor 108 according to the principles of the present application.

Figure 2:
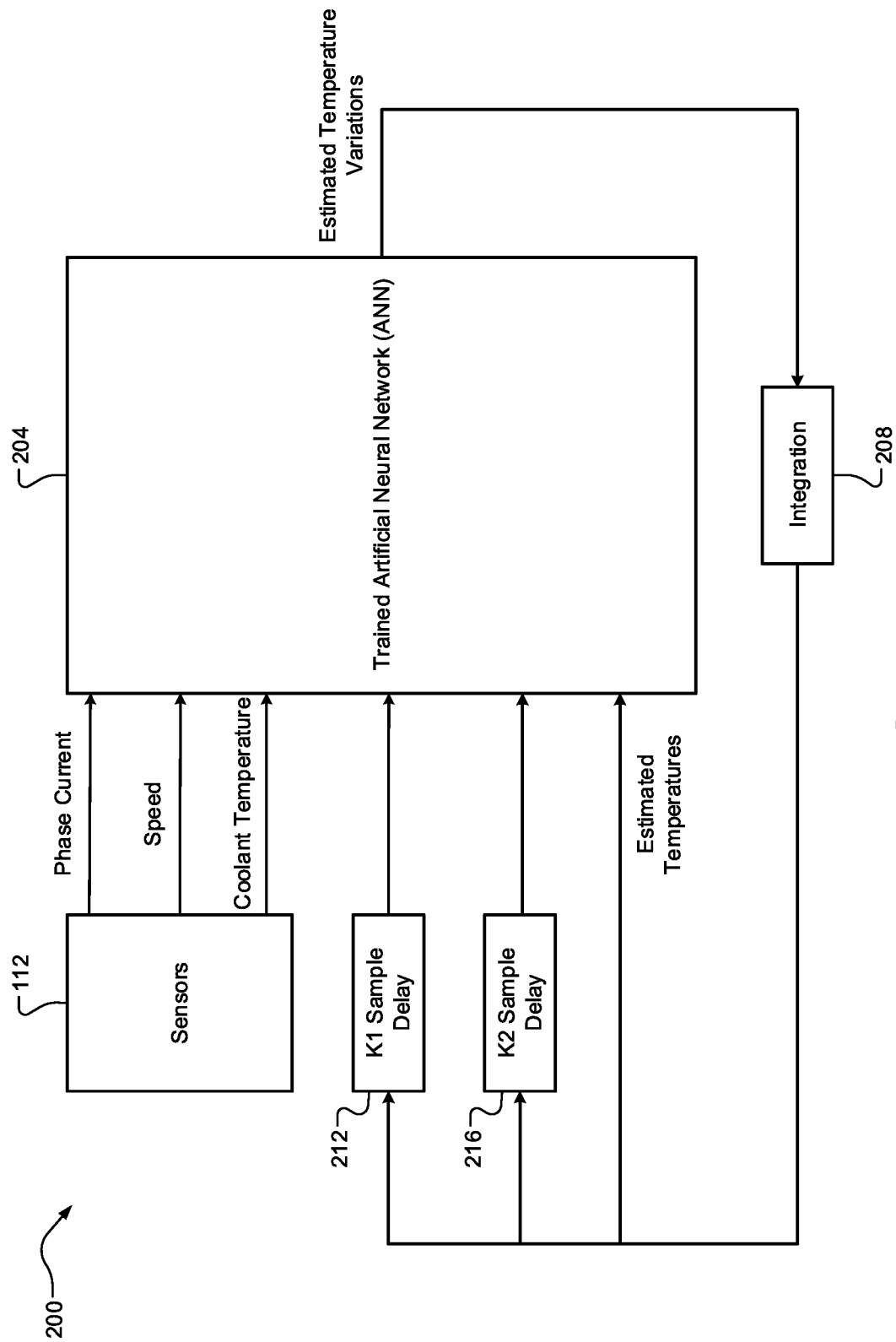
FIG. 2 is a functional block diagram of an example architecture for the temperature estimation system for the electric motor according to the principles of the present application.

Referring now to FIG. 2, a functional block diagram of an example architecture 200 for the temperature estimation system 128 according to the principles of the present application is illustrated. As shown, a trained ANN or trained ANN temperature estimation model 204 receives a set of inputs including parameters measured by sensors 112 and previously estimated stator/rotor temperatures (e.g., feedback and delayed feedback). The measured parameters include at least electric motor phase current (e.g., winding currents), electric motor speed (e.g., rotor speed), and electric motor coolant temperature.

In one exemplary implementation, the trained ANN temperature estimation model is a recurrent-type ANN that also uses the estimated stator and rotor temperatures (delayed and non-delayed versions) as inputs. The trained ANN temperature estimation model is initially trained using temperature measurements from one or more thermocouples mounted on the stator of the electric motor 108 and an infrared (IR) sensor directed at the rotor of the electric motor 108. These sensors are only used temporarily for training and are not required for the vehicle implementation, thereby reducing costs and complexity.

The trained ANN temperature estimation model is then stored by the controller 120 (e.g., in memory) and subsequently accessed by the controller 120 for real-time stator/rotor temperature estimation. Based on the measured parameters from the sensors 112 and previous temperature estimates, the trained ANN temperature estimation model 204 estimated the stator/rotor temperatures (e.g., changes in stator/rotor temperatures). In one exemplary implementation, an integration block 208 integrates these estimated stator/rotor temperature changes over time to generate estimated stator/rotor temperatures.

These estimated stator/rotor temperatures are fed back into the trained ANN temperature estimation model 204 as an input, along with delayed versions/samples of the estimated stator/rotor temperatures. In one exemplary implementation, these delays blocks K1 212 and K2 216 are approximately 100 milliseconds (ms) and 200 ms, respectively, but it will be appreciated that these delay values could be tuned to any particular application. Finally, the controller 120 is configured to utilize the estimated stator/rotor temperatures for improved control of the electric motor 108 (e.g., improved torque/efficiency).

Figure 3:
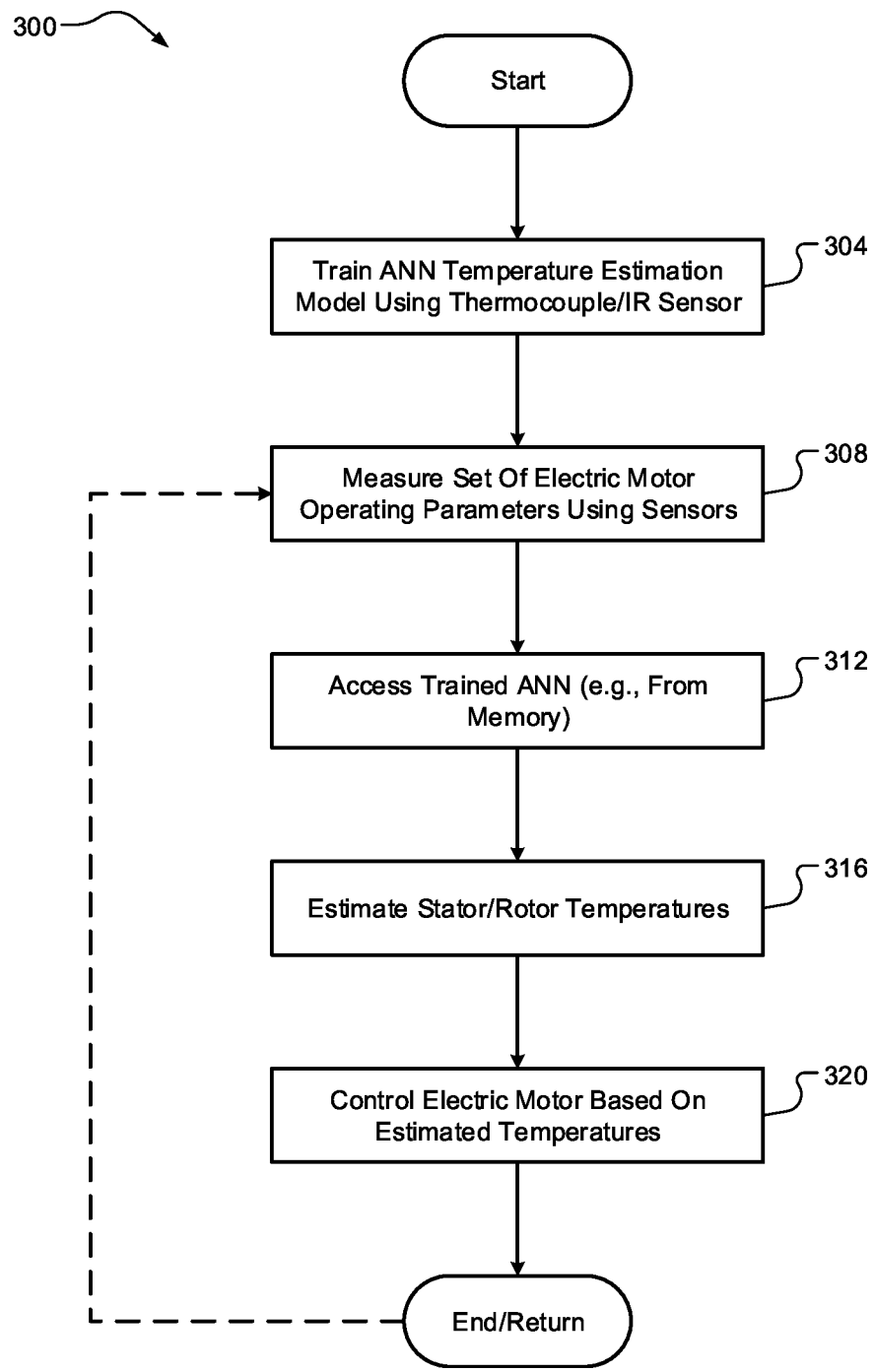
FIG. 3 is a flow diagram of an example temperature estimation method for an electric motor of a vehicle according to the principles of the present application.

Referring now to FIG. 3, a flow diagram of an example temperature estimation method 300 for an electric motor of a vehicle according to the principles of the present application is illustrated. As previously mentioned, while this method 300 is described with specific reference to components of vehicle 100, it will be appreciated that this method 300 could be applicable to any suitable electric motor. At 304, the ANN is initially trained using stator thermocouple (s) and an IR sensor directed at the rotor and the trained ANN temperature estimation model is loaded into the controller 120. This could be performed, for example, at vehicle build-time in a controlled plant calibration environment. It will be appreciated that the trained ANN temperature estimation model could have any suitable design with nodes/layers to achieve a desired performance. At 308, the controller 120 obtains the set of measured electric motor parameters (e.g., phase current, speed, coolant temperature) from the sensors 112. At 312, the controller 120 accesses the trained ANN temperature estimation model (e.g., from memory). At 316, the controller 120 estimates the stator/rotor temperatures based on the set of measured electric motor parameters and previous estimates/samples. At 316, the controller 120 controls the electric motor 108 based on the estimated stator/rotor temperatures to achieve improved performance/efficiency. The method 300 then ends or returns to 308 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A temperature estimation system for an electric motor of a vehicle, the system comprising:
    a set of sensors configured to measure a set of operating parameters of the electric motor including at least (i) phase current, (ii) speed, and (iii) coolant temperature, wherein the vehicle does not include a temperature sensor permanently associated with a stator of the electric motor or a rotor of the electric motor, or that remains implemented on the vehicle after a temporary calibration period; and
    a controller configured to:
        access a trained artificial neural network (ANN) temperature estimation model, wherein the trained ANN temperature estimation model is trained across all operating regions of the electric motor and based on temperature measurements from a first temperature sensor temporarily mounted on the stator and a second temperature sensor temporarily directed at the rotor during the temporary calibration period,
        using only the trained ANN temperature estimation model with the set of operating parameters of the electric motor as inputs, estimate temperatures of the stator and the rotor of the electric motor, and
        control operation of the electric motor based on the estimated temperatures of the stator and the rotor,
    wherein the controller does not utilize empirical look-up tables for resistance-based estimation of the temperatures of the stator and the rotor.

2. The system of claim 1, wherein the trained ANN temperature estimation model is a recurrent-type ANN that also uses the estimated temperatures of the stator and the rotor as inputs.

3. The system of claim 2, wherein two of the inputs provided to the trained ANN temperature estimation model include the estimated temperatures of the stator and the rotor delayed by first and second delays, respectively.

4. The system of claim 3, wherein the first delay and the second delay are approximately 100 milliseconds and 200 milliseconds, respectively.

5. The system of claim 1, wherein the first temperature sensor is a thermocouple and the second temperature sensor is an infrared temperature sensor.

6. The system of claim 1, wherein the set of operating parameters of the electric motor consists of (i) the phase current of the electric motor, (ii) the speed of the electric motor, and (iii) the coolant temperature of the electric motor.

7. A temperature estimation method for an electric motor of a vehicle, the method comprising:
    measuring, by a set of sensors, a set of operating parameters of the electric motor including at least (i) phase current, (ii) speed, and (iii) coolant temperature, wherein the vehicle does not include a temperature sensor permanently associated with a stator of the electric motor or a rotor of the electric motor, or that remains implemented on the vehicle after a temporary calibration period;
    accessing, by a controller of the vehicle, a trained artificial neural network (ANN) temperature estimation model, wherein the trained ANN temperature estimation model is trained across all operating regions of the electric motor and based on temperature measurements from a first temperature sensor temporarily mounted on the stator and a second temperature sensor temporarily directed at the rotor during the temporary calibration period;
    using only the trained ANN temperature estimation model with the set of operating parameters of the electric motor as inputs, estimating, by the controller, temperatures of the stator and the rotor of the electric motor; and
    controlling, by the controller, operation of the electric motor based on the estimated temperatures of the stator and the rotor,
    wherein the controller does not utilize empirical look-up tables for resistance-based estimating of the temperatures of the stator and the rotor.

8. The method of claim 7, wherein the trained ANN temperature estimation model is a recurrent-type ANN that also uses the estimated temperatures of the stator and the rotor as inputs.

9. The method of claim 8, wherein two of the inputs provided to the trained ANN temperature estimation model include the estimated temperatures of the stator and the rotor delayed by first and second delays, respectively.

10. The method of claim 9, wherein the first delay and the second delay are approximately 100 milliseconds and 200 milliseconds, respectively.

11. The method of claim 7, wherein the first temperature sensor is a thermocouple and the second temperature sensor is an infrared temperature sensor.

12. The method of claim 7, wherein the set of operating parameters of the electric motor consists of (i) the phase current of the electric motor, (ii) the speed of the electric motor, and (iii) the coolant temperature of the electric motor.

* * * * *